United States Patent
Li et al.

(10) Patent No.: US 9,196,022 B2
(45) Date of Patent: Nov. 24, 2015

(54) IMAGE TRANSFORMATION AND MULTI-VIEW OUTPUT SYSTEMS AND METHODS

(71) Applicant: OmniVision Technologies, Inc., Santa Clara, CA (US)

(72) Inventors: Jin Li, San Jose, CA (US); Jizhang Shan, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 28 days.

(21) Appl. No.: 14/203,016

(22) Filed: Mar. 10, 2014

(65) Prior Publication Data
US 2015/0254818 A1 Sep. 10, 2015

(51) Int. Cl.
G06K 9/36 (2006.01)
G06T 5/00 (2006.01)
G06T 3/00 (2006.01)

(52) U.S. Cl.
CPC ............... *G06T 5/006* (2013.01); *G06T 3/0006* (2013.01); *G06T 2207/10016* (2013.01); *G06T 2207/20172* (2013.01)

(58) Field of Classification Search
USPC .................. 382/275, 276, 154, 293, 295, 296; 239/1, 11, 155; 348/42, 84, E7.002; 356/124; 345/581, 586, 419, 427, 590, 345/611, 640, 648
See application file for complete search history.

(56) References Cited

U.S. PATENT DOCUMENTS

| | | | |
|---|---|---|---|
| 4,630,773 A * | 12/1986 | Ortlip | 239/1 |
| 5,321,797 A | 6/1994 | Morton | |
| 6,173,087 B1 | 1/2001 | Kumar et al. | |
| 7,333,238 B2 * | 2/2008 | Anson | 358/1.9 |
| 8,593,480 B1 * | 11/2013 | Ballestad et al. | 345/590 |
| 2010/0119172 A1 | 5/2010 | Yu et al. | |
| 2012/0114262 A1 | 5/2012 | Yu et al. | |

FOREIGN PATENT DOCUMENTS

EP 2180447 A1 4/2010

OTHER PUBLICATIONS

Hughes, Ciaran, et al. "Review of Geometric Distortion Compensation in Fish-Eye Cameras" ISSC 2008, Galway, Jun. 18-10, 6 pp.
Hughes, C., et al. "Wide-angle Camera Technology for Automotive Applications: A Review" IET Intell. Transp. Syst., 2009, vol. 3, No. 1, pp. 19-31.

(Continued)

*Primary Examiner* — Anh Do
(74) *Attorney, Agent, or Firm* — Lathrop & Gage LLP (57) ABSTRACT

An image transformation and multi-view output system and associated method generates output view data from raw image data using a coordinate mapping that reverse maps pixels of the output view data onto the raw image data. The coordinate mapping is stored in a lookup table and incorporates perspective correction and/or distortion correction for a wide angle lens used to capture the raw image data. The use of the lookup table with reverse mapping improves performance of the image transformation and multi-view output system to allow multi-view video streaming of images corrected for one or both of perspective and distortion.

24 Claims, 11 Drawing Sheets

(56) References Cited

OTHER PUBLICATIONS

Bangadkar, S., et al., "Mapping Matrix for Perspective Correction from Fish Eye Distorted Images" 2011 International Conference on Recent Trends in Information Technology, IEEE, Jun. 3-5, 2011, 1 page.

Jagannathan, L., et al., "Perspective Correction Methods for Camera-Based Document Analysis" presented at the International Institute of Information Technology, Gachibowli, Hyderabad, India, Aug. 29, 2005, 11 pp.

Planet "ICA-8350 3 Mega-pixel Vandalproof Fish-Eye IP Camera" datasheet, pulled from http://www.planet.com.tw/en/product/images/45908/C-ICA-8350_s.pdf, dated 2013, 6 pp.

AXIS "M3007-PV Technical Specifications", User Manual Ver. M5.4, Feb. 2013, 5 pp.

AXIS M3007-PP Network IP Camera video-clip, Network Webcams at http://www.networkwebcams.co.uk/blog/2012/11/24/first-look-axis-m3007-pv-panoramic-network-camera/, Nov. 24, 2012, 8 pp.

Dhane, Pranali, et al., "A Generic Non-Linear Method for Fisheye Correction", International Journal of Computer Applications (0975-8887), vol. 51-No. 10, Aug. 2012, pp. 58-65.

Altera White Paper "A Flexible Architecture for Fishey Correction in Automotive Rear-View Cameras", Oct. 2008, ver. 1.2, 8 pp.

Van Wie, Peter, et al., "A Landsat Digital Image Rectification System", Purdue University LARS Symposia, Paper 151, 1976, 11 pp.

Data Sheet "LogiVIEW Perspective Transformation and Lens Correction Image Processor" Xylon LogicBRICKS, ver. 3.05, Nov. 19, 2013, pp. 1-11.

"Fisheye Lense Correction Made Simple", pulled from www.connectingindustry.com, Michelle Winny, Jun. 8, 2012, 4 pp.

Asari, K. Vijayan "Design of an Efficient VLSI Architecture for Non-Linear Spatial Warping of Wide-angle Camera Images", Journal of Systems Architecture 50 (2004), pp. 743-755.

Wei, Jin, et al., "Fisheye Video Correction", IEEE Transactions on Visualization and Computer Graphics, vol. 18, No. 10, Oct. 2012, pp. 1771-1783.

Turturici, Mauro, et al., "Low-power DSP System for Real-time Correction of Fish-eye Cameras in Automotive Driver Assistance Applications", J Real-Time Image Proc DOI 10.1007/s11554-013-0330-9, Mar. 3, 2013, 16 pp.

Taiwanese Patent Application 104104839 Office Action dated Sep. 9, 2015, 10 pages.

\* cited by examiner

IMAGE TRANSFORMATION AND MULTI-VIEW OUTPUT SYSTEMS AND METHODS

BACKGROUND

Digital imaging systems typically include one or more lenses and a digital image sensor. The digital image sensor captures light from an object or scene being imaged through the lenses and converts the light into electronic signals. The electronic signals are digitized and stored as digital image data in a semiconductor memory. Such digital imaging systems are used in a variety of consumer, industrial and scientific applications to produce still images and/or video, including mobile telephones, digital still image and video cameras, webcams, and other devices.

Most modern image sensors are complementary metal oxide semiconductor (CMOS) image sensors or charge-coupled device (CCD) image sensors consisting of a two-dimensional pixel array. A modern digital image sensor can include millions of pixels to provide high-resolution images.

The quality of digital images, including still and video images generated by a digital imaging system, can depend upon a variety of factors. In digital imaging systems with a wide-angle imaging lens, such as a fisheye lens, lens distortion can significantly affect the quality of the digital images. Lens distortion causes straight lines in a scene or object being imaged to appear curved in the image. The most common forms of distortion are radially symmetric, arising from the symmetry of the lens. Radial distortion can be classified as one of two main types: barrel distortion and pincushion distortion. Barrel distortion is common in images captured by wide-angle lenses, while pincushion distortion is often present in images captured by zoom or telephoto lenses.

In barrel distortion, image magnification decreases with distance from the optical axis. The effect is an image which appears to have been mapped around a sphere, or barrel. In pincushion distortion, image magnification increases with the distance from the optical axis. The visible effect is that lines that do not go through the center of the image are bowed inwards, toward the center of the image, like a pincushion. Complex distortion, which is a combination of barrel distortion and pincushion distortion, starts out as barrel distortion close to the image center and gradually turns into pincushion distortion toward the image periphery.

In conventional digital imaging systems, the error generated by lens distortion can be corrected by signal processing carried out in an image signal processor (ISP) formed on a semiconductor chip die. The ISP receives the digital image data from the digital image sensor, which is also typically formed on a semiconductor chip die. To carry out the correction of the distorted digital image data, a large buffer memory is used to store several hundred lines of the distorted image data. The required memory is sufficiently large that it cannot be included as part of the ISP chip. As a result, an additional memory chip, e.g., a dynamic random access memory (DRAM) device, is required. The additional device impacts the size and cost of the digital image system. Also, the additional device introduces delays in accessing the memory and complicates memory access bandwidth issues.

SUMMARY

In one embodiment, an image transformation and multi-view output method generates an output view from a raw image. The raw image is received and each pixel coordinate of the output view is reverse mapped to a location of the raw image using a coordinate mapping. The coordinate mapping corrects at least one of (a) perspective and (b) distortion within the raw image. An intensity of each pixel of the output view is determined based upon information at the correspondingly mapped pixel location of the raw image.

In another embodiment, an image transformation and multi-view output system generates an output view from a raw image. The system includes a lookup table, stored in a non-volatile memory, containing coordinate mapping from the output view to the raw image, and a reverse mapper for generating the output view from the raw image using the lookup table. The coordinate mapping corrects at least one of (a) perspective and (b) distortion within the raw image.

In another embodiment, a method is provided for generating a coordinate mapping stored in a lookup table used by an image transformation and multi-view output system having an imaging lens, an image sensor for capturing a raw image from the lens, and an output device for displaying a corrected image. Parameters of the image transformation and multi-view output system, including both of a distortion curve and a distortion center of the imaging lens, are received. Inverse perspective correction is determined based upon the angular orientation of the imaging lens's optic axis with respect to chief rays incident on the lens from an object in the lens's field of view. Inverse distortion correction is determined based upon one or both of the distortion curve and the distortion center. The coordinate mapping is generated based upon the inverse perspective correction and inverse distortion correction; wherein the coordinate mapping includes an inverse transformation that is used by the transformation and multi-view output system to generate the output view from the raw image.

DETAILED DESCRIPTION OF THE EMBODIMENTS

Delays between frames in video imaging systems employing lenses with a wide field of view, such as cameras for automotive driver assistance, decrease the system's utility. The delays degrade a viewer's ability to respond appropriately to changes in the images captured by the system. The choppy or sputtering video stream resulting from such delays may deter potential users, such as drivers, from viewing it at all. Hence, the ability to correct distorted images while displaying them at a "smooth" frame-rate is a valuable feature in such video technologies, as described below in connection with accompanying FIGS. 1-11.

Distortion removal methods involving a reverse mapping have assisted video technologies. A reverse mapping maps pixels in the output image back to locations in the raw distorted image. In a forward mapping algorithm, each pixel in the distorted image is mapped to pixels in the corrected image. However, such algorithms are computationally inefficient, as many pixels in the distorted image are not mapped into the corrected image. By considering only mapped pixels in the raw image, reverse mapping methods are more efficient, faster, and require less computational resources than forward mapping methods.

A way to speed up distortion removal in an imaging system is to pre-compute the reverse mapping and store the results on a lookup table. For example, an imaging system that includes a CMOS image sensor may execute the mapping algorithm (forward or reverse) on-chip for each captured image and then display the transformed image. Replacing the algorithm with a lookup table containing the algorithm results decreases the time required for image distortion correction and for applying other image transformations.

Fast image transformation is important for generating live distortion-free streaming video from images captured with distortion—such as those captured by a fisheye imaging lens. For certain imaging applications, as described below, it is advantageous to have a "multi-view" feature that allows a user to select and view one or more transformed regions of a raw image. For example, rear-view automotive cameras and surveillance video systems, which use wide-angle imaging lenses that introduce significant distortions, benefit from such selection and transformation. With a computationally expensive distortion removal algorithm, providing a multi-view feature from the captured video limits an attainable video frame rate, resulting in choppy video output. Such choppy output makes the video unpleasant to view and hinders the user's ability to quickly respond to information presented. Prior art image distortion correction systems lack the combination of multiple transformable images and dynamically (or "real-time") reconfigurable multi-view output.

The disclosure now described relates to methods and associated systems for transforming a raw digital image to remove image artifacts such as distortion and perspective errors associated with images captured by a wide-angle lens such as a fisheye lens. One exemplary method enables multi-view video streaming of corrected images and selected sub-view regions such that the selection multiple displayed views can be changed in real time.

Figure 1:
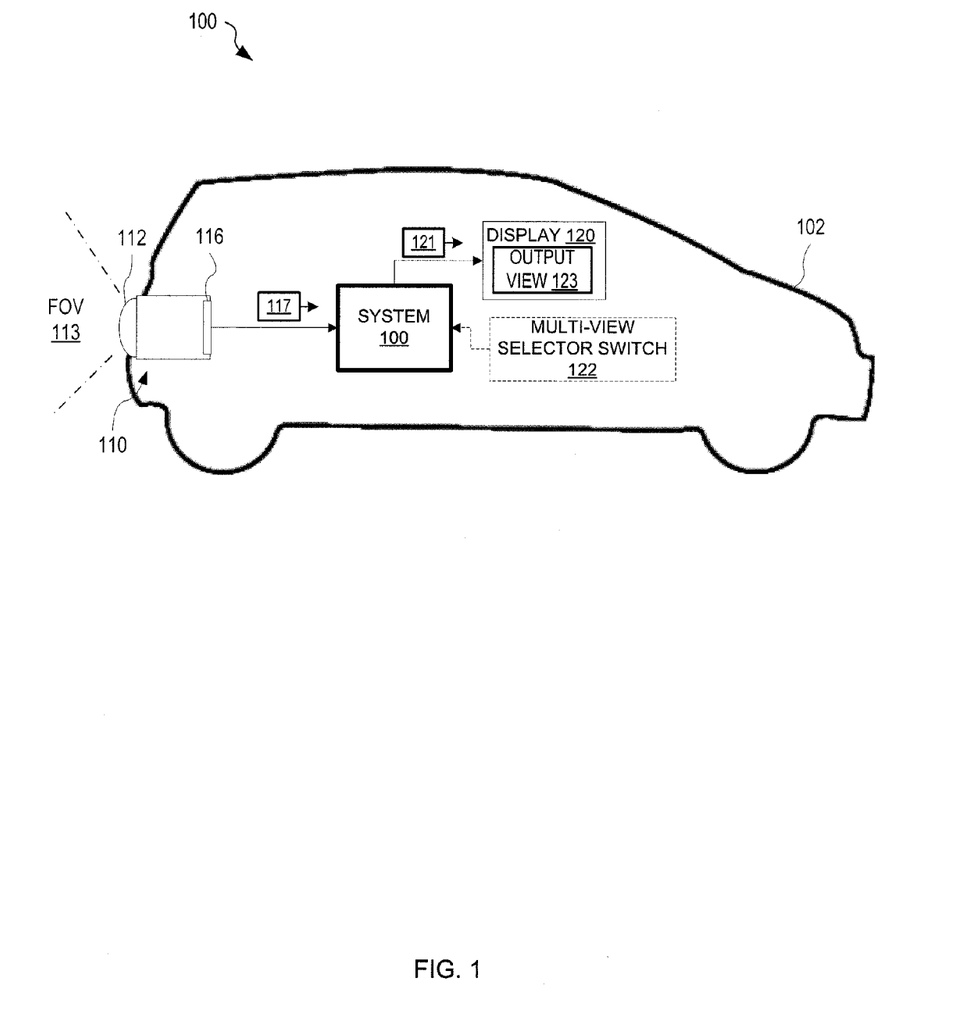
FIG. 1 shows an exemplary image transformation and multi-view output system configured with a vehicle having a rear-view camera, a display, and an optional multi-view selector switch, in an embodiment.

FIG. 1 shows an exemplary image transformation and multi-view output system 100 configured with a vehicle 102 having a rear-view camera 110, a display 120, and an optional multi-view selector switch 122. Camera 110 has an imaging lens 112 and an image sensor 116. Imaging lens 112 is a wide-angle lens such as a fisheye lens for example. Image sensor 116 is for example implemented in CMOS, but may be implemented in other technologies without departing from the scope hereof. System 100 is for example implemented as a single integrated circuit, wherein it may be configured within camera 110 or display 120.

In one example of operation, imaging lens 112 images an object in its field of view 113 onto image sensor 116, which generates and sends raw image data 117 to image transformation and multi-view output system 100. Image transformation and multi-view output system 100 transforms at least part of raw image data 117 into output view data 121, which is displayed on display 120 as output view 123. If included, optional multi-view selector switch 122 may be used to select alternative output views for generation by image transformation and multi-view output system 100 and display corresponding transformed versions of raw image data 117 on display 120. Image transformation and multi-view output system 100 may also generate and display multiple views within output view 123 concurrently on display 120 from raw image data 117.

Digital image data may be captured by an image sensor containing a two-dimensional array of pixels. Image sensor 116 has, for example, a two-dimensional array of pixels, each pixel having a position and intensity. Pixel position is a two-dimensional coordinate location of the pixel within the pixel array. For example, a pixel array in a VGA image sensor has dimensions 640 by 480 and its pixel positions, using zero-based numbering, range from (0,0) to (639,479). Raw image data captured by that sensor contains a corresponding two-dimensional array of pixel intensity values. With few exceptions, a location in raw image data determined by a mapping will have non-integer coordinates corresponding to a position between pixels. Pixel intensity is the brightness of the pixel when displaying digital image data, for example, an integer between 0 and 255 inclusive.

Display device 120 displays output view data 121, which is represented as a two-dimensional array of pixel values, each having a position and intensity value. Hence, when referring to digital image data, such as raw image data 117 or output view data 121, this specification will refer pixels that constitute data that can be represented as an image. Each pixel that constitutes such data has a pixel position and pixel intensity value.

Figure 2:
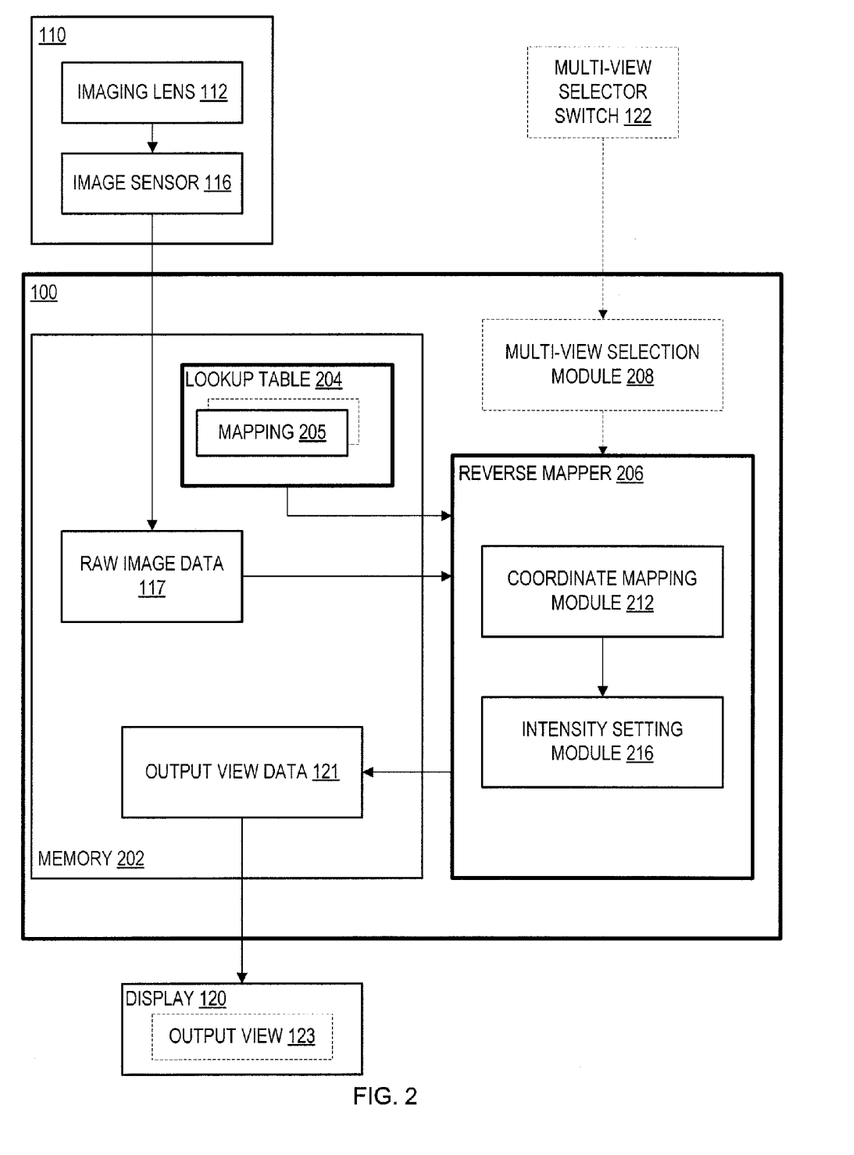
FIG. 2 is a schematic showing the image transformation and multi-view output system of FIG. 1 in further exemplary detail, in an embodiment.

FIG. 2 is a schematic showing image transformation and multi-view output system 100 of FIG. 1 in further exemplary detail. Image transformation and multi-view output system 100 includes a memory 202, a reverse mapper 206, and optionally a multi-view selection module 208. Memory 202 stores received raw image data 117 (e.g., from image sensor 116 of camera 110), a lookup table 204, and generated output view data 121. Memory 202 is implemented at least in part as non-volatile memory (e.g., for storing lookup table 204) and at least in part as volatile memory (e.g., for temporarily storing raw image data 117 and output view data 121). Lookup table 204 contains at least one coordinate mapping 205 that maps output view data 121 to at least part of raw image data 117, to correct perspective within raw image data 117 based upon output view data 121. Coordinate mapping 205 may also correct distortion imparted by imaging lens 112, thereby improving quality and clarity of output view 123 generated from raw image data 117.

Reverse mapper 206 includes a coordinate mapping module 212 and an intensity setting module 216. Coordinate mapping module 212, based upon lookup table 204, maps each pixel of output view data 121 to a corresponding portion of raw image data 117. Intensity setting module 216 retrieves intensity values from the mapped portion of raw image data 117 and sets the pixel intensity value within output view data 121 according to these intensity values. In one embodiment, reverse mapper 206 is implemented in hardware wherein high frame rates for generation of output view data 121 from raw image data 117 may be achieved. That is, perspective and distortion correction of raw image data 117 to form output view data 121 is performed at sufficiently high speeds using lookup table 204 such that updates of output view 123 are not delayed and thereby perceived movement remains smooth such that a viewer is unaware of any transformation process.

In one example of operation, for each pixel within output view data 121, coordinate mapping module 212 utilizes coordinate mapping 205 within lookup table 204 to determine a location within raw image data 117. Intensity setting module 216 determines an intensity value for the pixel within output view data 121 based upon information of raw image data 117 at the determined location. Thus, computational load is reduced and power saved because only pixels of raw image data 117 that correspond to pixels within output view data 121 are processed, and pixels of the raw image data 117 that do not map to output view data 121 are not processed. Reverse mapper 206 is convenient for hardware implementation because (a) it directly maps pixel of output view data 121 onto raw image data 117, and (b) a single mapping operation using lookup table 204 is used to simultaneously implement one or both of perspective correction and distortion correction.

To enable imaged information from image sensor 116 to be transferred, at least in part, to output view 123, each pixel location in output view data is mapped "backward" to a location in raw image data 117. This mapping is considered a "reverse" mapping because an attribute of the output view data is mapped to an attribute of the input data.

In one embodiment, lookup table 204 contains multiple coordinate mappings 205, where each coordinate mapping 205 generates a different output view 123 from raw image data 117. A user may select, using multi-view selector switch 122 for example, one particular coordinate mapping 205 to generates a desired output view 123. Optionally, coordinate mapping 205 may also be configured to generate multiple sub-views within output view 123, where each sub-view is mapped to a portion of raw image data 117. As shown in the following examples, concurrently mapped portions of raw image data 117 may overlap to generate sub-views within output view 123.

In one example of use, one of a plurality of output views is selected automatically based upon one or more sensed conditions relative to the vehicle. For example, where the vehicle is fitted with ultrasonic proximity detection, image transformation and multi-view output system 100 may be controlled to display one or more predefined views when proximity to an external object is detected, such that an appropriate view of the external object is automatically displayed to a driver of the vehicle.

Multiple types of image correction may be implemented within lookup table 204. For example, lookup table 204 may implement a cylindrical view that has correction along one direction (e.g., vertical or horizontal) with negligible loss of field of view in the orthogonal direction. In another example, lookup table 204 may implement a rectilinear view that includes distortion correction along two orthogonal axes, but with reduced field of view along these axes, where, by generating multiple rectilinear views centered about different regions of the raw image, compensation may be made for any reduced field of view.

Coordinate mapping 205 may also include image processing operations such as a rotation operation and scaling operation (zoom).

Coordinate mapping 205 is for example generated by a coordinate mapping generator 1000 (FIG. 10) that may implement calibration of imaging lens 112 and perspective and distortion correction within each coordinate mapping 205 that is then used within lookup table 204 of image transformation and multi-view output system 100.

In one embodiment, reverse mapper 206 employs a nearest-neighbor algorithm to set the output view pixel intensity value to the raw image pixel intensity of the pixel located at $(x_m, y_n)$ that is closest to the mapped raw-image coordinate $(x_{raw}, y_{raw})$. Other embodiments may employ more accurate methods that account for intensities of multiple pixels close to mapped raw-image coordinate $(x_{raw}, y_{raw})$. For example, multi-neighbor interpolation algorithms that involving intensities of the three, four, or N pixels closest to mapped raw-image coordinate $(x_{raw}, y_{raw})$. These methods include, but are not limited to, interpolation algorithms such as bilinear interpolation and bicubic interpolation.

In one embodiment, interpolation algorithm results are pre-computed and stored in coordinate mapping 205 of lookup table 204. For example, each element of coordinate mapping 205 may include an array that identify corresponding raw image pixel locations and includes weight values for each. Reverse mapper 206 computes a weighted average of pixel intensities based on the identified pixel locations and weight values stored in coordinate mapping 205.

FIGS. 3-6 show exemplary operation of system 100, FIGS. 1-2. FIGS. 3-6 are best viewed together with the following description.

Figure 3:
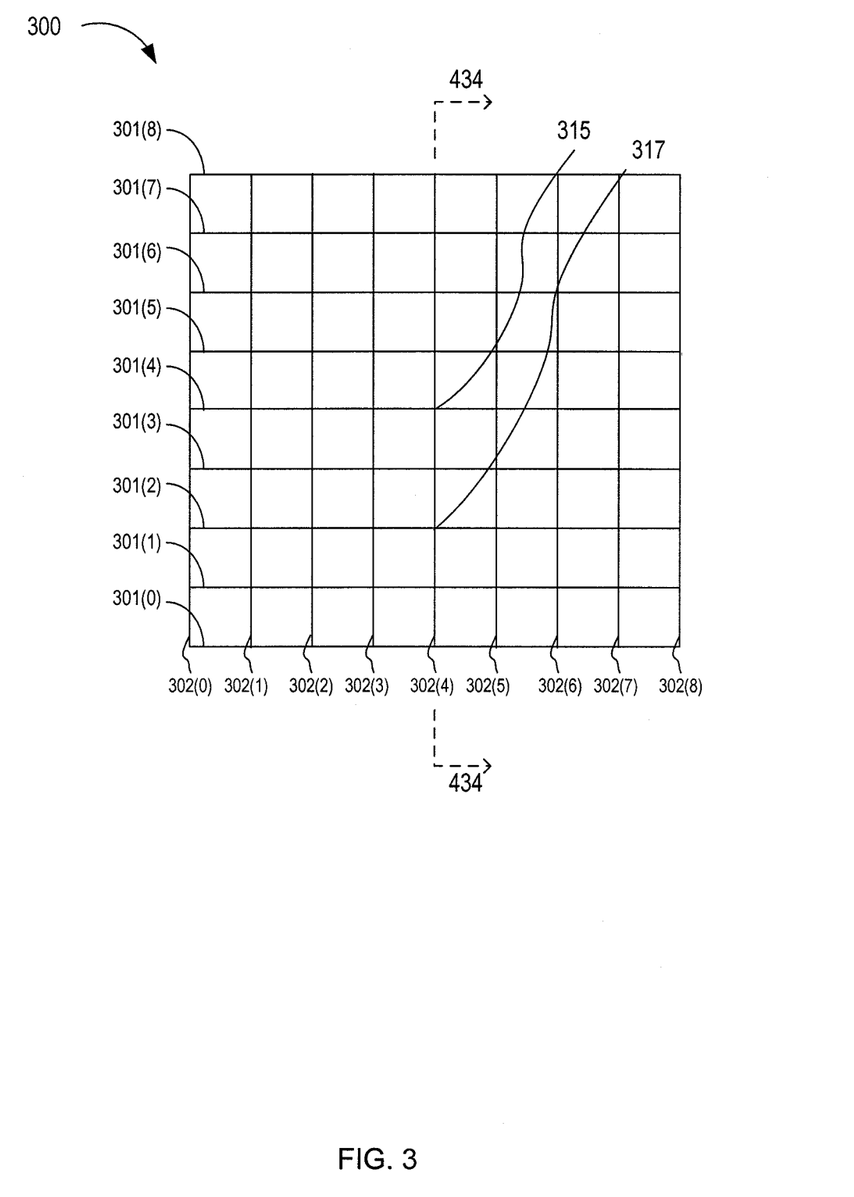
FIG. 3 shows an exemplary wire grid imaged by the camera of FIG. 1 and processed by image transformation and multi-view output system of FIG. 1.

FIG. 3 shows one exemplary wire grid 300 imaged by camera 110 of FIG. 1 and processed by image transformation and multi-view output system 100. To better illustrate functionality of image transformation and multi-view output system 100, wire grid 300 is a planar surface with an 8×8 square grid of intersecting horizontal lines 301 and vertical lines 302, where horizontal line 301(4) and vertical line 302(4) cross at an intersection 315, and horizontal line 301(2) and 302(4) cross at an intersection 317.

Figure 4:
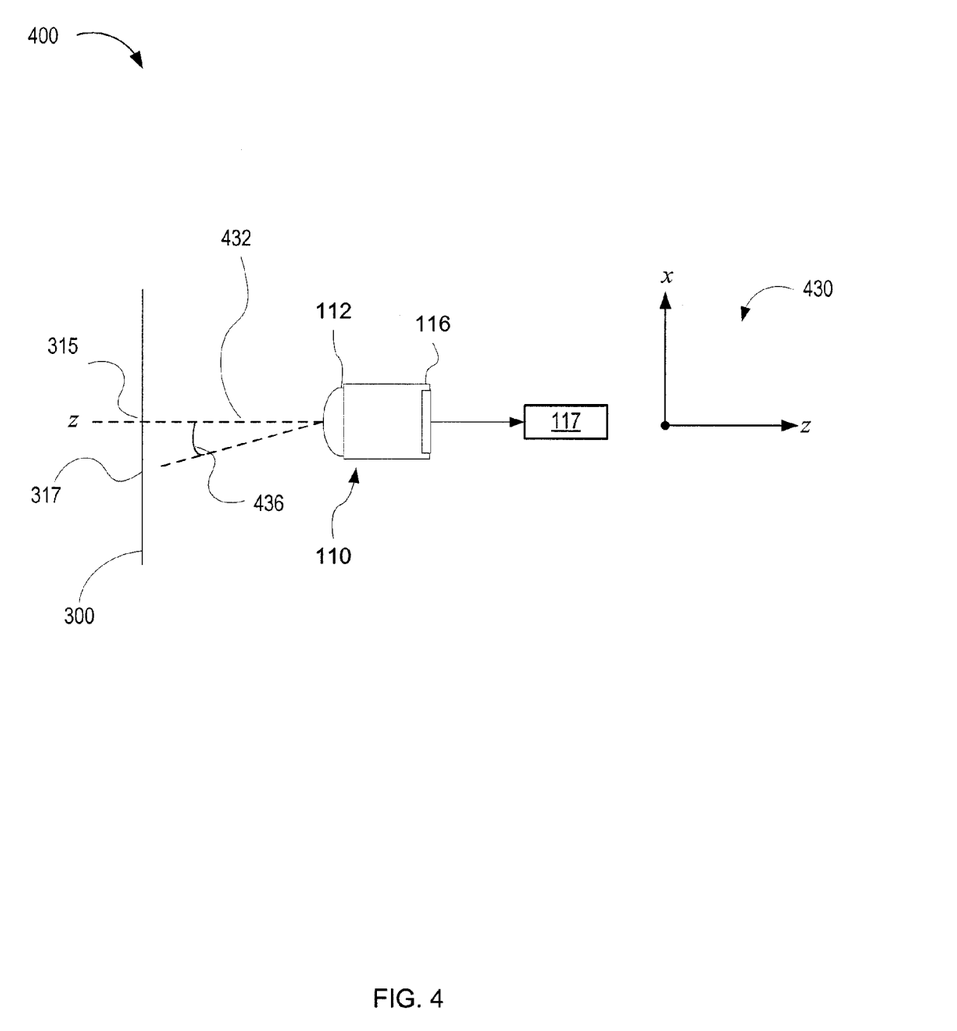
FIG. 4 shows an imaging configuration where the camera of FIG. 1 captures raw image data of an object.

FIG. 4 shows imaging configuration 400, where camera 110 captures raw image data 117 of wire grid 300 shown as a cross-section along a line 434. Camera 110 is positioned such that the optical axis 432 of imaging lens 112 intersects wire grid 300 at intersection 315 and is perpendicular to the plane of wire grid 300. Imaging lens 112 thereby images wire grid 300 onto image sensor 116 to capture raw image data 117. In right-handed coordinate axes 430, the y-axis is perpendicular to the x-z plane.

Figure 5:
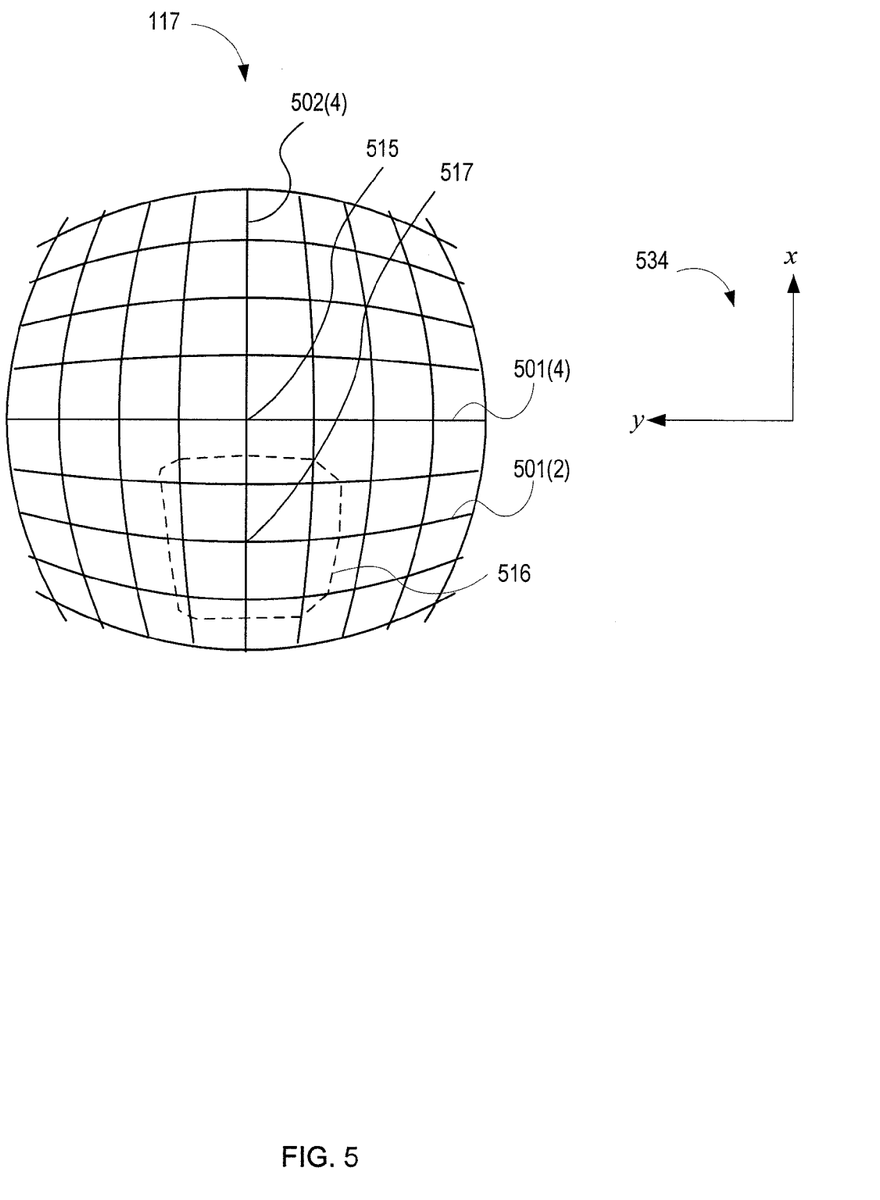
FIG. 5 shows a raw image of the object of FIG. 3 captured by the camera of FIG. 4.

FIG. 5 shows raw image data 117 as captured by camera 110 of wire grid 300 when configured as shown in FIG. 4. Right-handed coordinate axes 534 is coordinate axes 430 rotated by 90° about the x-axis such that the z-axis of coordinate axes 534 is perpendicular to the x-y plane. Coordinate axes 534 shows the orientation of raw image 512 in relation to camera 110 and wire grid 300.

In raw image data 117, vertical line 502(4) is an image of center vertical line 302(4) and horizontal line 501(4) is an image of horizontal line 301(4). Raw image data 117 has barrel distortion that is typical of images captured using a wide-angle lens, resulting in bowing of horizontal lines 301(0)-(3) and 301(5)-(8) and vertical lines 502(0)-(3) and 502(5)-(8). Vertical line 302(4) and horizontal line 301(4), which cross at center intersection 515 of raw image data 117, remain relatively straight since barrel distortion in raw image data 117 is at a minimum at these locations. Intersection 515 is an image of intersection 315 and intersection 517 is an image of intersection 317. The chief ray from the center of wire grid 300 travels along the optical axis 432 of imaging lens 112, as shown in FIG. 4.

In the example of FIGS. 3-6, output view data 121 is centered on intersection 317 of wire grid 300, coordinate mapping 205 is therefore generated to map output view data 121 to region 516, designated by the dashed line, of raw image data 117.

Figure 6:
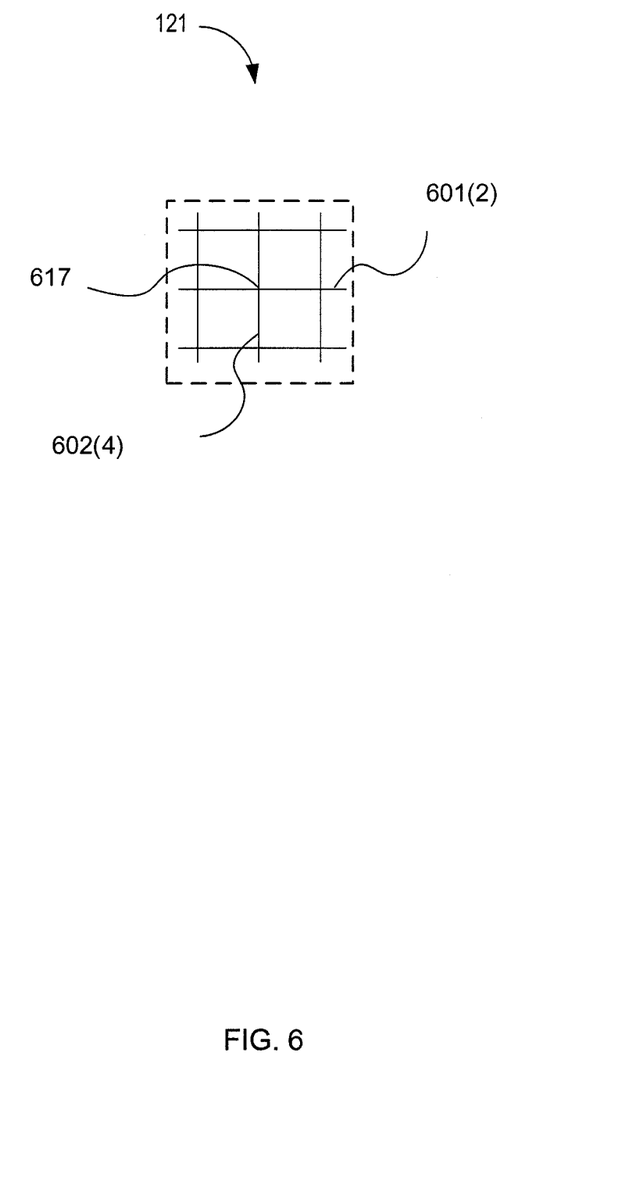
FIG. 6 shows an output view generated from the raw image of FIG. 5 by the image transformation and multi-view output system of FIG. 1.

FIG. 6 shows an output view 123, corresponding to region 516, generated by the image transformation and multi-view output system 100. Within output view 123, vertical line 602(4) corresponds to vertical line 302(4) of wire grid 300, and horizontal line 601(4) corresponds to horizontal line 301(2) of wire grid 300. Intersection 617 of horizontal line 601(4) and vertical line 602(4) thus corresponds to intersection 317 of wire grid 300. Since intersection 317 is not positioned at optical axis 432 of camera 110, a chief ray from intersection 317 to camera 110 has a non-zero perspective angle 436 to optical axis 432. Thus, coordinate mapping 205 includes both perspective and distortion correction such that reverse mapper 206 generates output view data 121 from region 516 of raw image data 117 with perspective and distortion correction. As shown, lines 601(2) and 602(4) of output view data 121 are substantially straight. It should be noted that when output view data 121 is rectilinear, region 516 within raw image data 117 need not be rectilinear.

To generate output view data 121, reverse mapper 206 uses lookup table 204 to map pixel coordinates of output view data 121 to locations within raw image data 117. For example, pixels displaying intersection 617 are reverse mapped to a location of intersection 517 in raw image data 117. Similarly, pixels displaying horizontal line 601(4) and vertical line 602(4) are mapped to respective locations of bowed horizontal line 501(2) and vertical line 502(4) within raw image data 117.

Figure 7:
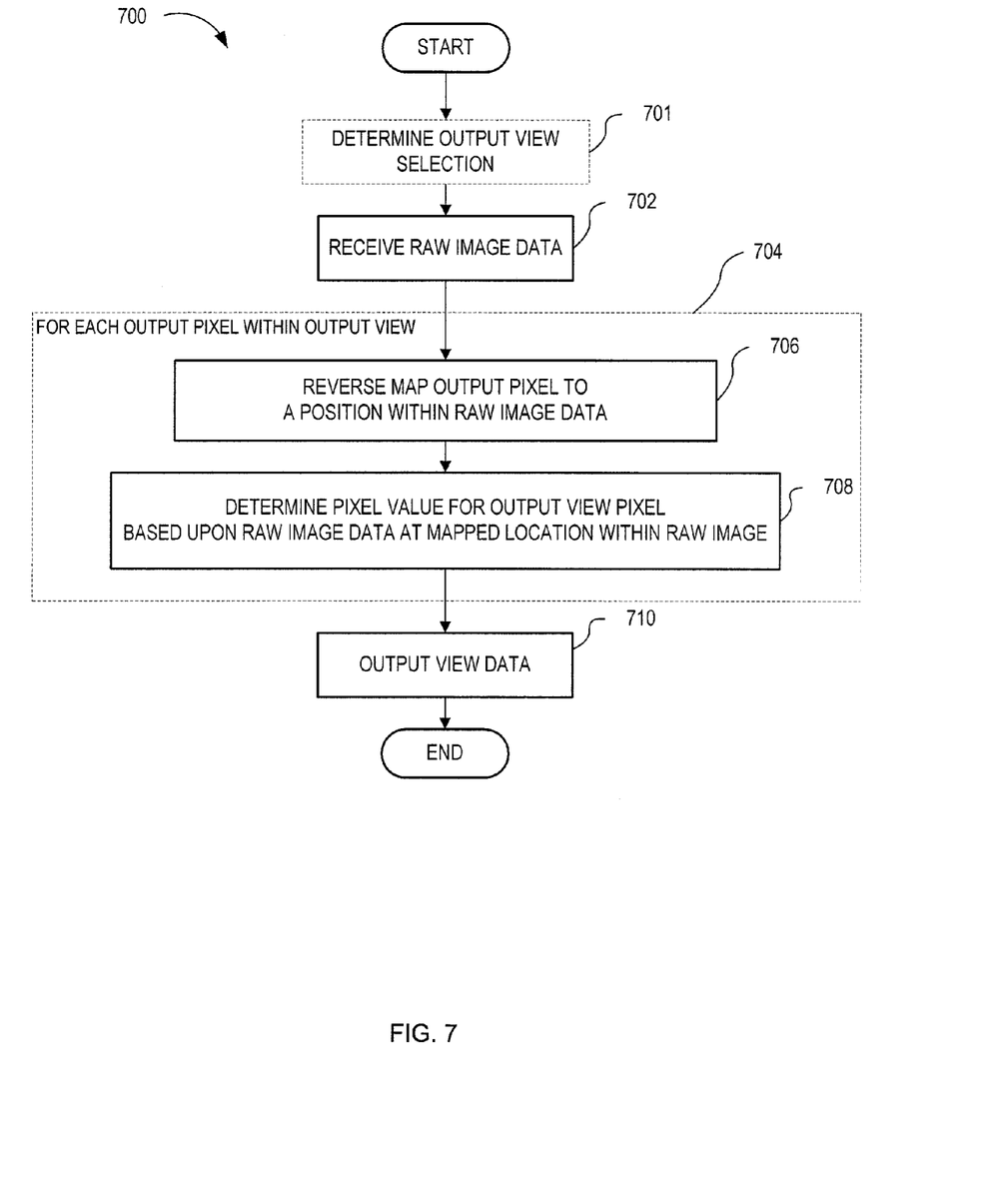
FIG. 7 illustrates one exemplary image transformation and multi-view output method, in an embodiment.

FIG. 7 illustrates one exemplary image transformation and multi-view output method 700 for generating output view data 121, FIG. 1, from raw image data 117 using lookup table 204, FIG. 2. Method 700 is, for example, implemented within reverse mapper 206 of image transformation and multi-view output system 100. Step 701 is optional. If included, in step 701, method 700 determines an output view selection. In one example of step 701, multi-view selection module 208 determines selection of output view data 121 from multi-view selector switch 122 to select coordinate mapping 205 within lookup table 204. In step 702, method 700 receives raw image data. In one example of step 702, image transformation and multi-view output system 100 receives raw image data 117 from image sensor 116.

In step 706, method 700 reverse maps each output pixel to a location within the raw image data. In one example of step 706, reverse mapper 206 uses lookup table 204 to reverse map the output pixel of output view data 121 to a location within raw image data 117. In step 708, method 700 determines a pixel intensity value for the output view pixel based upon raw image data at the mapped location. In one example of step 708, intensity setting module 216 of reverse mapper 206 uses interpolation of pixels proximate the mapped location within raw image data 117 to determine a value for the corresponding pixel within output view data 121. Steps 706 and 708 repeat, as indicated by dashed outline 704, until all pixels of output view data 121 are mapped and assigned a value. Each output pixel may be mapped sequentially or in parallel, depending upon implementation of reverse mapper 206.

In step 710, method 700 outputs the output view data. In one example of step 710, image transformation and multi-view output system 100 sends output view data 121 to display 120. When implemented for processing video frames, method 700 repeats for each received raw image data (video frame).

Figure 8:
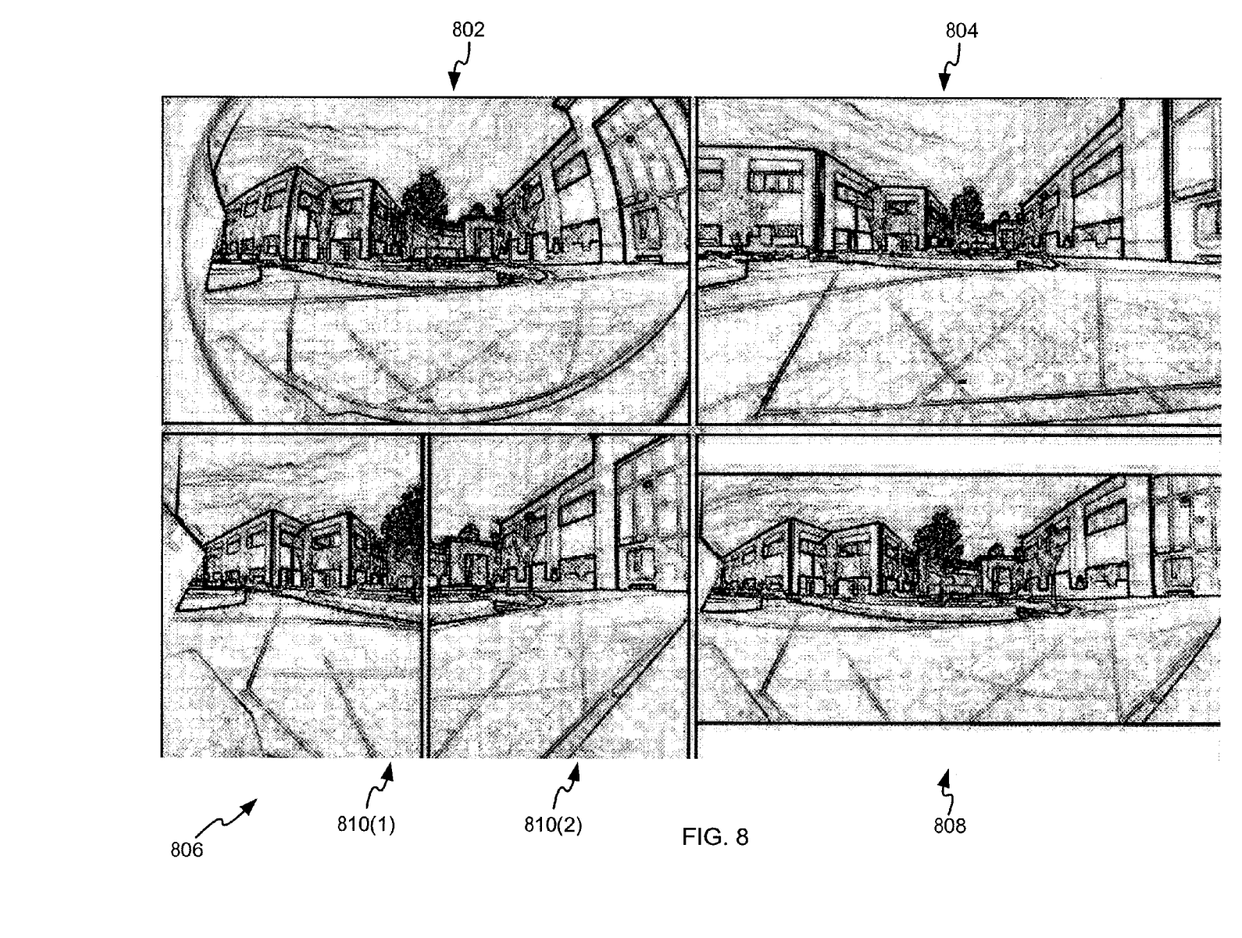
FIG. 8 shows an exemplary raw image and three exemplary output views generated by the image transformation and multi-view output system of FIG. 1.

FIG. 8 shows one exemplary raw image 802, representing raw image data 117, and three exemplary output views 804, 806, and 808, generated by the image transformation and multi-view output system 100. In the example of FIG. 8, output view 806 is formed of two exemplary sub-views 810(1) and 810(2) that are generated using a single coordinate mapping 205. Output views 804, 806, and 808 are for example generated from raw image 802 by image transformation and multi-view output system 100 of FIG. 1 using method 700 of FIG. 7. Output view 804 and each sub-view 810(1) and 810(2) of output view 806 exhibit rectilinear corrections of the center, left, and right views, respectively, of raw image 802. Output view 808 exhibits vertical correction of raw image 802, wherein only vertical distortions in raw image 802 are corrected while preserving almost the entire horizontal angle of view.

Figure 9:
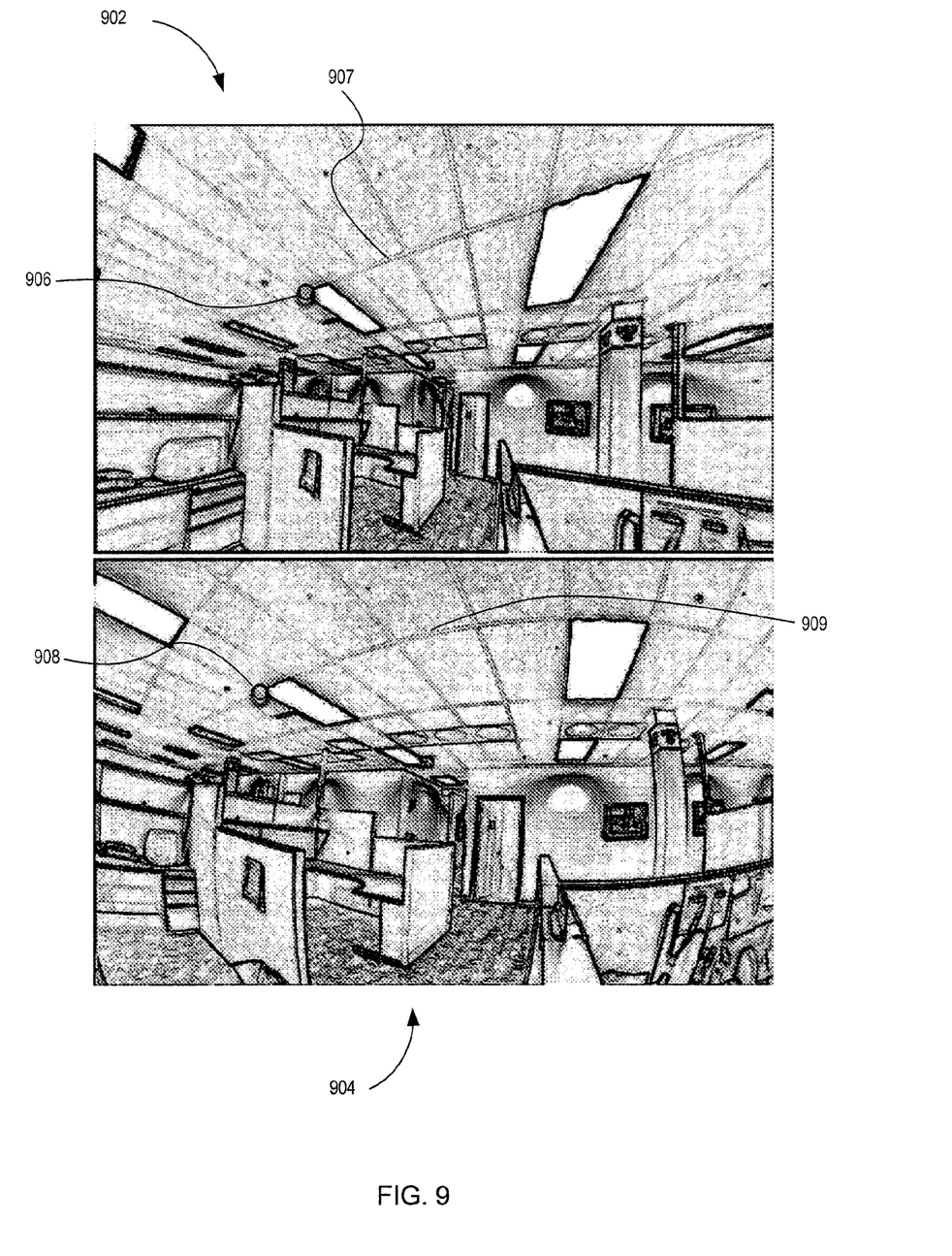
FIG. 9 shows a distorted raw image and an output view generated by the system of FIG. 1 implementing the method of FIG. 7 with perspective and distortion correction.

FIG. 9 shows a distorted image 904 and an output view 902 generated by image transformation and multi-view output system 100 using perspective and distortion correction within lookup table 204 and based upon method 700 of FIG. 7. Distorted image 904 represents raw image data 117 of FIG. 1 and output view 902 represents output view data 121. Using method 700, system 100 reverse maps pixels corresponding to the sphere 908 of output view 902 to locations in distorted image 904 corresponding to sphere 906.

Distorted image 904 exhibits barrel distortion, as shown by ceiling panel line 909 that bows away from the image center. Coordinate mapping 205 incorporates perspective and/or distortion correction such that, within output view 902, ceiling panel line 907 is straight. Although only barrel distortion is illustrated, coordinate mapping 205 may apply other types of distortion correction without departing from the scope hereof. For example, coordinate mapping 205 may apply pincushion distortion correction, and may correct any combination of barrel and pincushion distortion (i.e., complex distortion).

Figure 10:
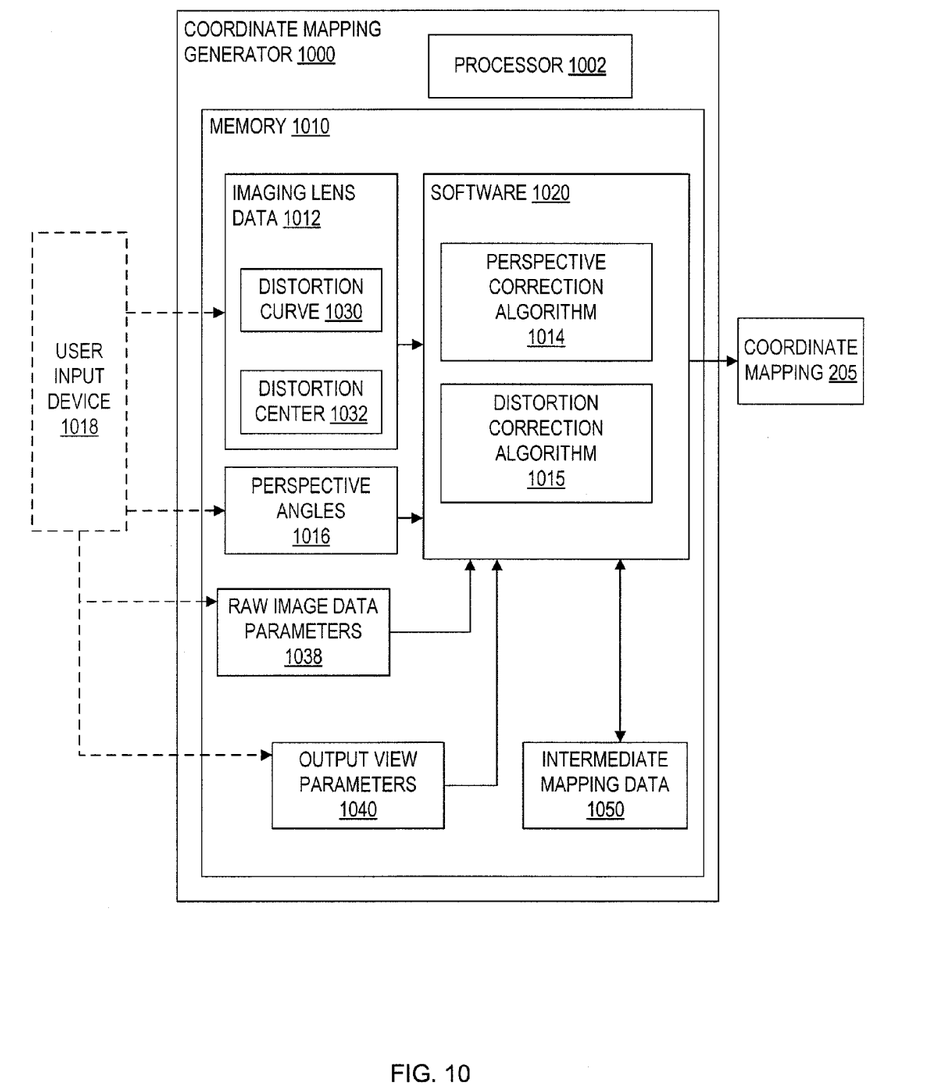
FIG. 10 is a schematic showing a coordinate mapping generator used for generating the lookup table of FIG. 2, in an embodiment.

FIG. 10 is a schematic showing one exemplary coordinate mapping generator 1000 for generating a coordinate mapping 205 for use within lookup table 204 of FIG. 2. Coordinate mapping generator 1000 is for example a computer that includes a processor 1002 and memory 1010 storing software 1020 that includes a perspective correction algorithm 1014. Memory 1010 represents one or both of volatile and non-volatile memory, as known in the art. Software 1020 has machine readable instructions that are executed by processor 1002 to implement functionality of coordinate mapping generator 1000, as described below. Memory 1010 is also shown storing imaging lens data 1012, which includes one or both of a distortion curve 1030 and a distortion center 1032 of imaging lens 112 (FIG. 1). Imaging lens data 1012 may also determine a field of view (e.g., FOV 113) of imaging lens 112.

Memory 1010 also stores raw image data parameters 1038 that define characteristics of raw image data 117 and output view parameters 1040 that define characteristics of output view data 121. For example, raw image data parameters 1038 include the pixel array dimensions of raw image data 117 that correspond to the pixel array of image sensor 116, output view parameters 1040 define a size of the pixel array used for output view 123.

Output view parameters 1040 may also include an output view size, that is, a digital zoom about a region of the raw image. Geometrically, this may be defined by a range of angle 436 in the x-z plane (FIG. 4) that spans the section of vertical line 502(4) sub-view 516 (FIG. 5) and a range of corresponding angles in the y-z plane that spans the section of bowed horizontal line 501(2) in sub-view 516.

Perspective angles 1016 are, for example, defined using pitch, yaw, and roll that correspond to a desired output view 123 relative to optical axis 432 of camera 110. One or both of imaging lens data 1012 and perspective angles 1016 are provided by a user via user input device 1018. Imaging lens data 1012 may be determined through measurement of imaging lens 112. As shown in FIG. 4, pitch, yaw, and roll are rotations about the x-axis, y-axis, and z-axis respectively.

Sub-views 810(1) and 810(2) (FIG. 8) illustrate perspective angles of output view 123. The vertical perspective angle (pitch) in each sub-views 810(1) and 810(2) is zero, as they do not differ from the vertical perspective of raw image 802. The horizontal perspective angles (yaw) of sub-views 810(1) and 810(2) differ both from each other and from raw image 802.

Perspective correction algorithm 1014, when executed by processor 1002, performs a mathematical inverse perspective correction on output view parameters 1040 based upon one or more of raw image data parameters 1038 and perspective angles 1016 to generate intermediate mapping data 1050 within memory 1010. A distortion correction algorithm 1015 is then executed by processor 1002 to generate coordinate mapping 205 based upon intermediate mapping data 1050, raw image data parameters 1038 and one or both of distortion curve 1030 and distortion center 1032. Coordinate mapping 205 thereby contains perspective correction and distortion correction to reverse map pixel coordinates of output view data 121 to raw image data 117.

Figure 11:
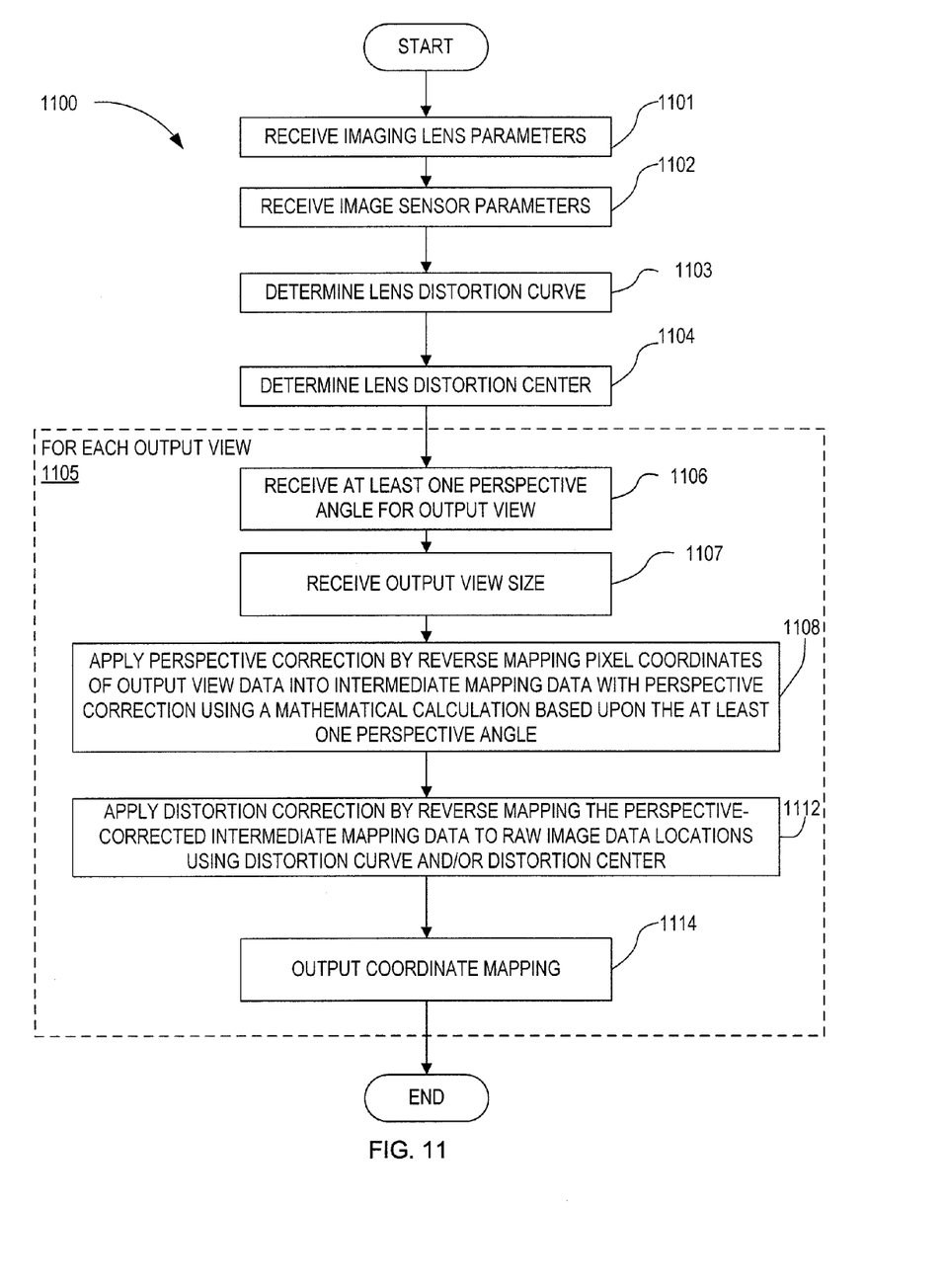
FIG. 11 shows a method for generating the lookup table of FIG. 2, in an embodiment.

FIG. 11 is a flowchart illustrating one exemplary method 1100 for generating coordinate mapping 205 for use within lookup table 204. Method 1100 is, for example, implemented within software 1020 of (FIG. 10 to generate coordinate mapping 205 for each of one or more desired output views 123 based upon characteristics of imaging lens 112 and raw image data 117.

In step 1101, method 1100 receives imaging lens parameters. In one example of step 1101, coordinate mapping generator 1000 receives an input from a user indicating field of view of imaging lens 112.

In step 1102, method 1100 receives parameters of raw image data. In one example of step 1102, coordinate mapping generator 1000 receives an input from a user indicating the attributes of raw image data 117 such as the pixel array dimensions, number of pixels, and pixel pitch.

In step 1103, method 1100 determines the lens distortion curve. In one example of step 1103, coordinate mapping generator 1000 controls and/or directs calibration equipment to measure distortion curve 1030 of imaging lens 112. In another example of step 1103, coordinate mapping generator 1000 receives the distortion curve 1030 from a third party, such as a user entering data provided by a manufacturer of imaging lens 112.

In step 1104, method 1100 determines a distortion center corresponding to a lens. In one example of step 1104, coordinate mapping generator 1000 controls and/or directs calibration equipment to measure distortion center 1032 of imaging lens 112 to generate a distortion center. In another example of step 1104, coordinate mapping generator 1000 receives distortion center 1032 from a third party, such as a user entering data provided by a manufacturer of imaging lens 112.

In step 1106, method 1100 receives at least one perspective angle for an output view to be generated. Each of the least one perspective angle represents an angle within the imaging lens field of view. In one example of step 1106, coordinate mapping generator 1000 receives an input from a user indicating perspective angles pitch, roll, and yaw. In one example of step 1106, coordinate mapping generator 1000 receives an input from a user specifying values of one or two of perspective angles pitch, roll, and yaw, wherein unspecified perspective angles are set to zero.

In step 1107, method 1100 receives an output view size. In one example of step 1107, output view size is defined, and input by the user, by two field-of-view angles, in orthogonal planes, relative to the axis defined by the perspective angle received in step 1106.

Information provided in steps 1106 and 1107 define a subfield of view of imaging lens 112 field of view, where the subfield of view is to be transformed to output view 123 by system 100.

In step 1108, method 1100 applies perspective correction by reverse mapping pixel coordinates (e.g., pixel coordinates $x_{out}, y_{out}$) of the selected output view data into intermediate mapping data using a mathematical calculation based upon the at least one perspective angle received in step 1106. In one example of step 1108, processor 1002 executes instructions of perspective correction algorithm 1014 to generate intermediate mapping data 1050 based on output view parameters 1040.

In step 1112, method 1100 applies distortion correction by reverse mapping the intermediate mapping data generated in step 1108 to the raw image data locations using distortion curve and/or distortion center. In one example of step 1112, distortion correction algorithm 1015 of coordinate mapping generator 1000 processes intermediate mapping data 1050 to incorporate one or both of distortion curve 1030 and distortion center 1032, determined in steps 1103 and 1104, respectively. In step 1114, method 1100 outputs the coordinate mapping. In one example of step 1114, coordinate mapping generator 1000 outputs coordinate mapping 205 for use within lookup table 204. For example, where image transformation and multi-view output system 100 is implemented as a single package (e.g., a single integrated circuit), coordinate mapping generator 1000 may write coordinate mapping 205 into memory 202 of image transformation and multi-view output system 100.

Steps 1106 through 1114 repeat, as indicated by dashed outline 1105, to generate one coordinate mapping 205 for each output view. For example, to generate one coordinate mapping 205 corresponding to each of output views 804, 806 and 808, steps 1106 through 1114 are iterated three times: first to generate coordinate mapping 205 corresponding to output image 804, second to generate coordinate mapping 205 corresponding to output image 806, and third to generate coordinate mapping 205 corresponding to output image 808. For the second iteration, where coordinate mapping 205 transforms raw image 802 into sub-views 810(1) and 810(2), steps 1106 through 1112 may repeat for each sub-view 810 and step 1114 combines the generates coordinate mappings 205 into a single coordinate mapping 205 for use within lookup table 204.

The order of steps within method 1100 may be changed without departing from the scope hereof. For example, step 1104 may precede step 1103 and step 1107 may be precede step 1106.

Changes may be made in the above methods and systems without departing from the scope hereof. It should thus be noted that the matter contained in the above description and shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for image transformation and multi-view output to a display device, comprising:
   receiving raw image data, generated by an image sensor, into a memory of a system that includes a lookup table stored in non-volatile memory and a reverse mapper;
   mapping, using the lookup table and a coordinate mapping module of the reverse mapper, each pixel coordinate of output view data, stored in the memory, to a location in raw image data using coordinate mapping that corrects at least one of (a) perspective and (b) distortion within the raw image;
   determining, using an intensity setting module of the reverse mapper, an intensity of each output pixel of the output view data based upon information within the raw image data proximate the correspondingly mapped location; and
   outputting the output view data to the display device.

2. The method of claim 1, further comprising selecting the coordinate mapping from a plurality of coordinate mappings stored within the lookup table.

3. The method of claim 1, wherein the step of mapping generates at least two sub-views within the output view data.

4. The method of claim 1, wherein the location within the raw image data identifies a pixel in the raw image data.

5. The method of claim 1, wherein the location within the raw image data identifies a group of pixels in the raw image data.

6. The method of claim 1, wherein the step of mapping corrects distortion along an axis of the image plane.

7. The method of claim 1, wherein the step of mapping corrects distortion along two orthogonal axes of the image plane.

8. The method of claim 1, wherein the step of mapping comprises image transformations selected from the group consisting of scaling and rotation.

9. The method of claim 1, the step of determining comprising an interpolation algorithm.

10. An image transformation and multi-view output system, comprising:
    a lookup table, stored in a non-volatile memory and containing coordinate mapping that maps pixels of output view data to locations within raw image data; and
    a reverse mapper for generating the output view data from the raw image data using the coordinate mapping;
    wherein the coordinate mapping comprises at least one of (a) perspective correction and (b) distortion correction.

11. The system of claim 10, the reverse mapper comprising an intensity setting module for interpolating between at least two input pixels of the raw image data to generate each output pixel intensity value of the output view data.

12. The system of claim 10, wherein the reverse mapper corrects distortion along an axis of the image plane.

13. The system of claim 10, wherein the reverse mapper corrects distortion along two orthogonal axes of the image plane.

14. The system of claim 10, wherein the output view data comprises two independent sub-views of the raw image data.

15. The system of claim 10, further comprising:
    at least one additional coordinate mapping stored within the lookup table; and
    a multi-view selection module for (a) receiving an input indicative of a selected output view, and (b) selecting one of the coordinate mapping and the additional coordinate mapping for use by the reverse mapper to generate the output view data.

16. The system of claim 10, wherein the coordinate mapping implements one or more of scaling and rotation.

17. The system of claim 10, wherein the lookup table and the reverse mapper are configured as a single integrated circuit.

18. The system of claim 10, wherein the output view data is sent to a display device for display to a user.

19. The system of claim 10, wherein the raw image data is a frame of an input video sequence data and wherein the output view data is displayed as a frame in a live video stream.

20. A method for generating a coordinate mapping for use in a lookup table used by an image transformation and multi-view output system, comprising:
    receiving parameters of an imaging lens, the parameters including both a distortion curve and a distortion center of the imaging lens;
    receiving parameters of raw image data;
    receiving at least one perspective angle corresponding to an output view of the image transformation and multi-view output system;
    applying inverse perspective correction to an output view data based upon the at least one perspective angle to generate an intermediate mappines;
    applying inverse distortion correction to the intermediate mapping data based upon at least one of the distortion curve and the distortion center to generate the coordinate mapping; and
    outputting the coordinate mapping for use within the image transformation and multi-view output system.

21. The method of claim 20 wherein the parameters include the field of view of the imaging lens.

22. The method of claim 20 wherein raw image data parameters includes pixel positions.

23. The method of claim 20, wherein the coordinate mapping comprises a scaling operation between the raw image data and the output view data.

24. The method of claim 20, wherein the coordinate mapping maps each pixel of the output view data to a position in the raw image data.

* * * * *

UNITED STATES PATENT AND TRADEMARK OFFICE
CERTIFICATE OF CORRECTION

PATENT NO. : 9,196,022 B2  
APPLICATION NO. : 14/203016  
DATED : November 24, 2015  
INVENTOR(S) : Li et al.

Page 1 of 1

It is certified that error appears in the above-identified patent and that said Letters Patent is hereby corrected as shown below:

In The Specification  
Column 5, line 37, "generates" should read -- generate --;  
Column 6, line 14, "that involving" should read -- that involve --;  
Column 6, line 22, "an array that identify" should read -- an array that identifies --;  
Column 9, line 8, "may be deter mined" should read -- may be determined --;  
Column 9, line 13, "sub-views" should read -- sub-view --;  
Column 9, line 33, "of (FIG. 10" should read -- of FIG. 10 --;  
Column 10, line 53, "combines the generates" should read -- combines the generated --;  
Column 10, line 58, "may be precede" should read -- may precede --;  
In The Claims  
Column 12, line 36, "generate an intermediate" should read -- generate intermediate --;  
Column 12, line 36, "mappines" should read -- mapping data --;  
Column 12, line 46, "includes" should read -- include --.

Signed and Sealed this  
Ninth Day of August, 2016

Michelle K. Lee  
*Director of the United States Patent and Trademark Office*